Jan. 16, 1968
A. H. DE ROOIJ ETAL  3,364,202
PROCESS FOR THE RECOVERY OF FREE SULFURIC
ACID FROM AMMONIUM BISULFATE
Filed April 5, 1965
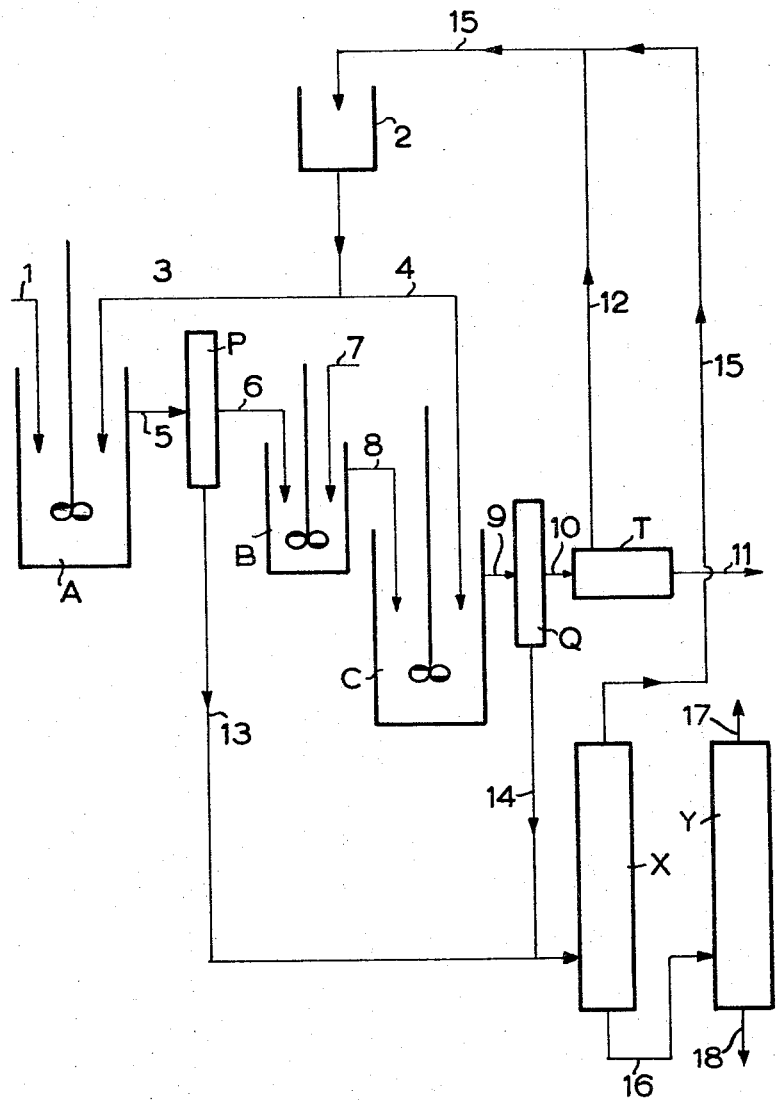
Inventors
Abraham H. Rooij
Jan Elmendorp
By Cushman, Darby & Cushman
attorneys

3,364,202
PROCESS FOR THE RECOVERY OF FREE SULFURIC ACID FROM AMMONIUM BISULFATE

Abraham H. de Rooij, Geleen, and Jan Elmendorp, Brunssum, Netherlands, assignors to Stamicarbon N.V., Heerlen, Netherlands
Filed Apr. 5, 1965, Ser. No. 445,415
Claims priority, application Netherlands, Apr. 8, 1964, 64—3,701
4 Claims. (Cl. 260—239.3)

The present invention relates to the recovery of free sulfuric acid, starting from ammonium bisulfate or a concentrated solution of this salt. The still increasing production of ammonium sulfate, which in various processes, e.g. in the preparation of cyclohexanone oxime and ε-caprolactam, is formed in large amounts as a by-product, owing to the neutralization of sulfuric acid with ammonia, constitutes a problem in the chemical industry.

The increasing production hampers the sale, so that the product has to be disposed of at prices which are hardly profitable.

With regard to the preparation of cyclohexanone oxime starting from hydroxylamine disulfonic acid and to the recovery of lactam from the oxime rearranged in sulfuric acid, modifications have already been proposed which yield ammonium bisulfate solutions as by-products instead of solutions containing ammonium sulfate.

Owing to their acid character, these ammonium bisulfate solutions can then be advantageously used instead of sulfuric acid in the decomposition of phosphate rock, or in the absorption of $NH_3$ from coke oven gases.

The aim of the invention is to recover free sulfuric acid from solutions containing ammonium bisulfate; this sulfuric acid can, after being concentrated to oleum by addition of $SO_3$, be used in the rearrangement of oxime to lactam.

It is a matter of common knowledge that in the extraction of ammonium bisulfate with an alcohol, sulfuric acid separates out and dissolves in the alcohol, while the ammonium bisulfate transformers into the solid double salt $(NH_4)_3H(SO_4)_2$ (see H. B. Dunnicliff in J. Chem. Soc. 123, pages 476–483, (1923)).

It is also known that upon continued extraction with alcohol part of said double salt may be split up into sulfuric acid and solid ammonium sulfate according to the reaction equation $$2(NH_4)_3H(SO_4)_2 \rightarrow H_2SO_4 + 3(NH_4)_2SO_4$$

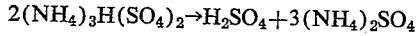

the sulfuric acid dissolving in the alcohol (see Th. Sabalitschka in Ber. der Deutschen Pharm. Gesellschaft 31, pages 193 and 196 (1921)). In all of these known techniques ethylalcohol has always been used as extraction agent. It has now been found that the conversion of ammonium bisulfate to sulfuric acid and ammonium sulfate proceeds more nearly to completion, and can be realized with less extraction agent per part by weight of ammonium bisulfate, if methylalcohol is employed as extraction agent is carried out in two stages, in the first of which ammonium bisulfate is converted to the solid double salt $(NH_4)_3H(SO_4)_2$ and sulfuric acid, while in the second stage the double salt is split up further into sulfuric acid and ammonium sulfate.

The sulfuric acid thus obtained may, after removal of the extraction agent by distillation and, if so desired, after being concentrated with $SO_3$, be used in the rearrangement of oxime to lactam; the ammonium sulfate formed can also be utilized if, as has recently been suggested, lactam is, without neutralization with ammonia, separated from a lactam sulfate solution containing sulfuric acid, as a result of which a solution containing ammonium bisulfate is re-formed.

The process according to the invention can also be applied to ammonium bisulfate, which, along with $NH_3$, is obtained by pyrolysis of ammonium sulfate.

The above-described extraction of the double salt $(NH_4)_3H(SO_4)_2$ does not produce a complete conversion into sulfuric acid and solid ammonium sulfate. After the extraction agent has been distilled off, the sulfuric acid still contains about 17% by weight of ammonium sulfate dissolved as ammonium bisulfate.

This sulfuric acid contaminated with ammonium sulfate can, however, without any objection, be used in the rearrangement of oxime to lactam, or in the decomposition of phosphate rock in the fertilizer industry.

Formation of the solid double salt $(NH_4)_3H(SO_4)$ is not hindered by the presence of water during the extraction, e.g. in an amount of 0–25% by weight calculated to the total weight of water and extraction agent; to enable the double salt to be converted into sulfuric acid and ammonium sulfate, the extraction agent must not be dry; to ensure that the conversion will be as complete as possible a water content of 15–50% by weight calculated to the total weight of water and extraction agent is desirable during the extraction.

The extractions may be carried out at ambient temperature. To achieve a rapid extraction without using unduly large liquid volumes, the weight ratio between the salts to be extracted and the dry extraction agent will in both extraction stages preferably be between 1:1 and 1:3.

A diagram illustrating a continuous realization of the process is shown in the attached figure. The process is carried out with the aid of three stirring vessels A, B and C, 2 filter devices P and Q, and 2 distillation columns X and Y.

The ammonium bisulfate to be extracted is supplied, via conduit 1, to stirring vessel A as solid salt or in the form of a concentrated solution, or, if so desired, in the form of a suspension. From storage tank 2 extraction agent is fed to the said vessel via conduit 3. A suspension of the double salt $(NH_4)_3H(SO_4)_2$ in the solvent containing sulfuric acid flows to filter device P via conduit 5.

The salt which has been filtered off is supplied, via conduit 6, to stirring vessel B, where it is mixed with water supplied through conduit 7 to form a saturated solution; via conduit 8, the said solution is fed to stirring vessel C which also receives extraction agent via conduit 4. The suspension of ammonium sulfate in extraction agent containing sulfuric acid, which has been prepared in stirring vessel C, is fed to filter device Q via conduit 9. The salt filtered off is supplied to drying drum T via conduit 10; after being condensed, the mixture of water vapour and extraction agent released in drum T is returned to storage tank 2 via the conduits 12 and 15.

Dry ammonium sulfate is discharged via conduit 11. The filtrate from the filter devices P and Q is fed to distillation column X via conduit 13 and 14, respectively.

After being condensed, the top product, extraction agent in vapour form, is fed back to storage tank 2 via conduit 15; the bottom product, a solution substantially containing sulfuric acid, is fed to distillation column Y via conduit 16. Water vapour escapes via conduit 17, and concentrated sulfuric acid is discharged via conduit 18.

Example

Using the method illustrated in the figure, 1000 kg./hour of ammonium bisulfate and 120 kg./hour of water are fed to stirring vessel A via conduit 1, while a mixture of 2000 kg. of methanol and 128 kg. of water is fed to the said vessel via conduit 3. 703 kg. of double salt, consisting of 327 kg. of $NH_4HSO_4$, 335 kg. of $(NH_4)_2SO_4$, 26 kg. of $H_2O$ and 15 kg. of methanol, are separated off in filter device P. They are mixed with 415 kg. of water in stirring vessel B, and, after that, extracted with 2000 kg. of methanol and 128 kg. of water in stirring vessel C. 502 kg. of ammonium sulfate, still containing 14 kg. of water and 5 kg. of methanol, are separated off in filter device Q. This water and methyl alcohol are removed in drying drum T, so that 483 kg. of ammonium sulfate are discharged via conduit 11.

Distillation of column X receives 2545 kg. of solution, consisting of 1985 kg. of methanol,
222 kg. of $H_2O$
248 kg. of $H_2SO_4$, and
90 kg. of $NH_4HSO_4$, via conduit 13, and, 2744 kg. of solution, consisting of 2010 kg. of methanol
555 kg. of $H_2O$,
110 kg. of $H_2SO_4$, and
69 kg. of $NH_4HSO_4$, via conduit 14.

The top product issuing from this column consists of 3995 kg. of methanol and 242 kg. of $H_2O$. The bottom product, consisting of 1052 kg. of a solution containing 40.5% by weight of $H_2SO_4$—calculated to the sum of the free sulfuric acid and water present—and furthermore 15% by weight of ammonium bisulfate, is concentrated in distillation column Y.

540 kg. of sulfuric acid, contaminated with ammonium sulfate and being composed of 79.0% by weight of $H_2SO_4$,
16.8% by weight of $(NH_4)_2SO_4$, and
4.2% by weight of $H_2O$ is discharged as bottom product.

We claim:
1. Process for the recovery of sulfuric acid from ammonium bisulfate by extraction with a readily water-miscible alcohol capable of dissolving sulfuric acid, the said process being characterized in that in a first extraction stage the ammonium bisulfate is converted with methylalcohol containing up to 25% by weight water into a solid double salt essentially having the composition $(NH_4)_3H(SO_4)_2$ and an extract containing free sulfuric acid, whereafter, the said double salt is separated off and, in a following extraction stage, converted with fresh methylalcohol containing water up to 50% by weight into solid ammonium sulfate and extract containing free sulfuric acid, and, finally, the two extracts containing free sulfuric acid are separated into sulfuric acid and methylalcohol by distillation.

2. Process according to claim 1, characterized in that solutions containing ammonium bisulfate, obtained in the preparation of oxime starting from hydroxylamine disulfonic acid and obtained in the preparation of a lactam, are extracted, and the resulting ammonium sulfate and sulfuric acid, after being concentrated with $SO_3$, are fed back to the lactam preparation.

3. The process of claim 1 wherein the water content of the said fresh methylalcohol is 15–50% by weight.

4. The process of claim 1 wherein the amount of the said ammonium bisulfate and said double salt to be converted is in a ratio of 1:1 to 1:3 with the said methylalcohol, the amount of methylalcohol being determined on a dry basis.

References Cited

H. Dunncliff et al., "Journal of Phys. Chem. 32," pp. 1697–1704 (1928).

G. Butler et al., "Chem. Soc. Journ. 117," p. 654 relied on (1920).

MILTON WEISSMAN, *Primary Examiner.*

OSCAR R. VERTIZ, *Examiner.*

A. J. GREIF, *Assistant Examiner.*